United States Patent [19]

Prudhomme

[11] 4,068,772
[45] Jan. 17, 1978

[54] DUAL LOAD TRAILER
[76] Inventor: C. R. Prudhomme, P.O. Box 219, Blanco, Tex. 78606
[21] Appl. No.: 758,765
[22] Filed: Jan. 12, 1977
[51] Int. Cl.² ............................................. B60P 3/08
[52] U.S. Cl. .................................. 214/505; 296/1 A
[58] Field of Search ....................... 214/505; 296/1 A
[56] References Cited
U.S. PATENT DOCUMENTS
3,718,227 2/1973 Swift ............................. 296/1 A X
3,970,203 7/1976 Watson ......................... 296/1 A X Primary Examiner—Robert G. Sheridan
Attorney, Agent, or Firm—O'Brien & Marks

[57] ABSTRACT

A trailer is disclosed which includes a trailer base and a carrier frame, the trailer base receiving one load and a load platform of the carrier frame receiving a second load. The load platform is mounted on legs which are pivotable at both ends so that the load platform can be swung from a carrying position to a loading position and back.

9 Claims, 5 Drawing Figures

DUAL LOAD TRAILER

BACKGROUND OF THE INVENTION

1. Field of the Invention

The present invention relates to trailers in general and, in particular, to trailers for receiving two separate loads, both loads preferably being wheeled vehicles.

2. Description of the Prior Art

The prior art is generally cognizant of article carriers, and boat carriers in particular, which tilt downward to allow loading of the article. U.S. Pat. Nos. 3,048,291 and 3,128,893 both disclose boat carriers including frames pivotable to a tilted position for loading the boat. U.S. Pat. Nos. 2,573,187, 2,765,940, 2,809,496, 2,931,528, 3,066,815, 3,144,150 and 3,964,626 show other carriers which tilt to allow loading of the article to be carried.

SUMMARY OF THE INVENTION

The present invention is summarized in that a trailer for carrying two loads includes a trailer base including wheel means and adapted for receiving a first load; a carrier frame carried by the trailer base and including a load platform, the load platform being movable relative to the trailer base and adapted for receiving a second load; and means to raise and lower the load platform between a first position above and parallel to the trailer base and a second position tilted relative to the trailer base and lowered so that a load may be loaded thereupon.

It is an object of the present invention to provide a trailer for carrying two loads in which both loads can be easily loaded.

It is another object of the present invention to construct such a trailer in which the load platform for the upper load is movable to a tilted position touching the ground to receive the load.

It is yet another object of the present invention to provide such a trailer that is stable and secure in highway conditions.

Other objects, advantages and features will become apparent from the foregoing specification when taken in conjunction with the accompanying drawings.

DESCRIPTION OF THE PREFERRED EMBODIMENT

Figure 1:
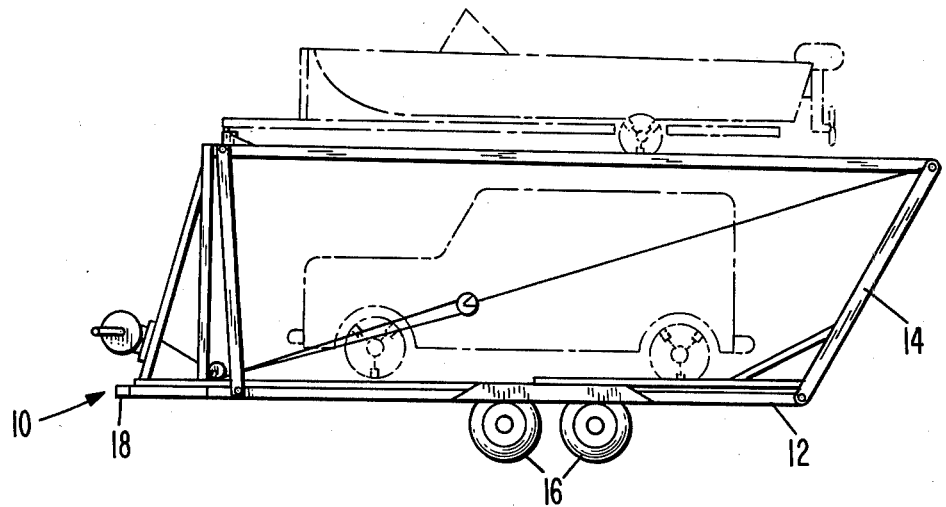
FIG. 1 is a side elevation view of a dual load trailer constructed according to the present invention.

Shown in FIG. 1 is a dual load trailer, indicated generally at 10, constructed according to the present invention. The trailer 10 includes a trailer base 12 and a carrier frame 14 which is mounted thereon. The trailer base 12 includes wheels 16 and an appropriate hitch device 18 at the front thereof as well as appropriate lighting, signalling and other safety devices. As can be seen in FIG. 1, a first load, such as a small car, motorcycle, or other wheeled vehicle, can be carried on the trailer base 12 while a second load, also preferably a wheeled vehicle such as the boat trailer in FIG. 1, can be carried above it by the carrier frame 14.

Figure 2:
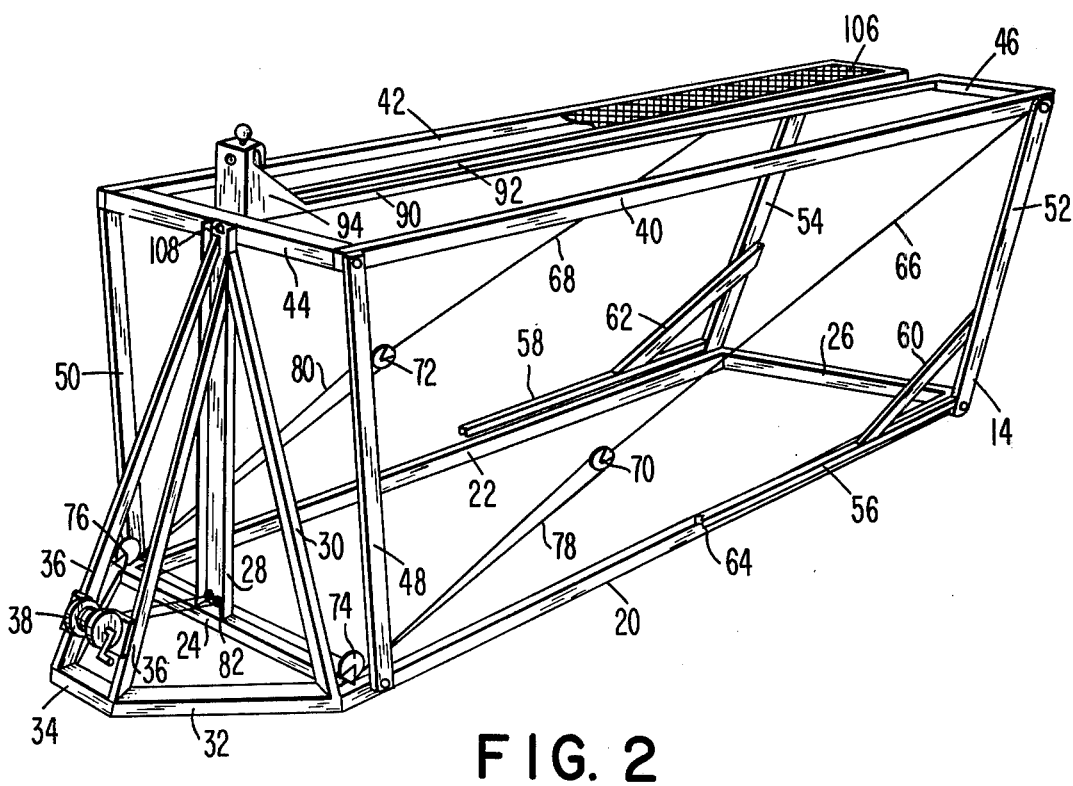
FIG. 2 is a perspective view of the carrier frame of the trailer of FIG. 1.

Details of the carrier frame 14 are shown in FIG. 2. The base of the carrier frame 14 includes a pair of side base beams 20 and 22 connected at their front and rear ends by a front base beam 24 and a rear base beam 26. A vertical support post 28 is provided extending vertically upward from the center of the front base beam 24 and is supported on its sides by a pair of strut supports 30. A pair of base extension beams 32 extend from the front extreme edges of the front base beam 24 to a base nose piece 34. A pair of winch support struts 36 extend from the base nose piece 34 to the upper end of the support post 28. A winch 38 is fixed between the winch support struts 36.

Normally carried above and parallel to the side base beams 20 and 22 are a pair of top frame side beams 40 and 42 which are connected at their extreme front and rear ends by a top frame front beam 44 and a top frame rear beam 46. A pair of front legs 48 and 50 each has a first of its ends pivotally secured to the front ends of a respective one of the top frame side beams 40 and 42. The other end of each of the front legs 48 and 50 is pivotally secured to a respective one of each of the side base beams 20 and 22, the connection to the side base beams 20 and 22 being just rearward of the connection to the top frame side beams 40 and 42 for each of the front legs 48 and 50. The front legs 48 and 50, therefore, when in the position as shown in FIGS. 1 and 2, tilt very slightly forward.

Each of a pair of rear legs 52 and 54 has a first of its ends pivotally secured to the rearmost ends of the respective top frame side beam 40 or 42 and the other of its ends pivotally secured to the rearmost end of the respective base side beam 20 or 22. The top frame side beams 40 and 42 are longer than the base side beams 20 and 22 so that the rear legs 52 and 54 are longer than the front legs 48 and 50 and also tilt toward the rear of the carrier frame 14 with the angle of the rearward tilt of the rear legs 52 and 54 being greater than the angle of the forward tilt of the front legs 48 and 50. Extending forwardly from the bottom end of each of the back legs 52 and 54 is a respective lift strut 56 and 58. The lift struts 56 and 58 are attached at an angle to the rear legs 52 and 54 such that when the carrier frame 14 is in the configuration shown in FIGS. 1 and 2, the lift struts 56 and 58 lie alongside the side base beams 20 and 22. A pair of braces 60 and 62 securely fix the lift struts 56 and 58 to the back legs 52 and 54. Each of the lift struts 56 and 58 has a cable yoke 64 formed on its front end.

A pair of lifting and securing cables 66 and 68 are secured to the rearmost ends of the top frame side beams 40 and 42 and have secured to their other ends respective moving pulley blocks 70 and 72. A pair of stationary pulley blocks 74 and 76 are provided secured to the foremost top edges of the side base beams 20 and 22. A pair of winching cables 78 and 80 each has a first end secured to the front of the respective base side beams 20 or 22 and is received in turn respectively through the moving pulley block 70 or 72, through the stationary pulley 74 or 76 and through one of a pair of cable guides 82 to the winch 38 to which the other end of each of the winch cables 78 and 80 is secured.

Figure 5:
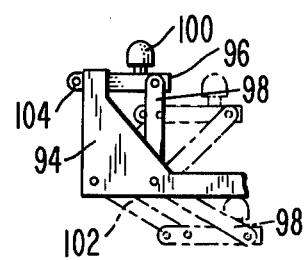
FIG. 5 is an enlarged side elevation view of the hitch post of the trailer of FIG. 1.

Between the top frame side beams 20 and 22 and extending parallel to them are positioned a pair of guide channel beams 90 and 92 extending from the top frame front beam 44 to the top frame rear beam 46. The guide channel beams 90 and 92 are placed in parallel along opposite sides of the longitudinal center line of the carrier frame 14 and form a guide channel therebetween which preferably has a bottom plate also formed in it to close its bottom surface. A trailer hitch post 94 is formed between the front ends of the guide channel beams 90 and 92, the details of the hitch post 94 being shown in FIG. 5. A hitch plate 96 has a hitch ball 100 formed thereon and has a set of legs 98 and 102 pivotally attached to its rear and front ends. The legs 98 and 102 are also pivotally attached to the ends of the guide channel beams 90 and 92 which form the hitch post 94. A locking tab 104 with a hole formed in it is provided in the foremost end of the hitch plate 96 to extend through a hole provided in the front surface of the hitch post 94 when the hitch plate 96 is in the position shown by the solid lines in FIG. 5. Suitable decking 106, shown in FIG. 2 only on one side of the top of the carrier frame 14, can be provided between the top frame side beams 40 and 42 and the guide channel beams 90 and 92 to form a top surface for the carrier frame 14, with the guide channel formed between the guide channel beams 90 and 92 preferably being left uncovered. A redundant securement lock 108 is formed as an eyelet extending from the front surface of the top frame front beam 44 through a hole in the support post 28 to further secure the carrier frame 14 in its erected position as shown in FIGS. 1 and 2. The securement lock 108 could also be formed as a mechanical fastener of any suitable type or could merely be a bolt extending through holes in both the support post 28 and the top frame front beam 44 to secure them together.

In its operation in its erected configuration as shown in FIG. 1, the dual load trailer 10 carries a pair of loads. As mentioned previously, the lower load is carried on the trailer base 12. The upper load is carried by the carrier frame 14 which forms a load platform for the upper load. This load platform is formed by the top frame beams 40, 42, 44, and 46, the guide channel beams 90 and 92 and the decking 106. This load platform is movable between the carrying position, shown in FIGS. 1 and 2, and a loading position, shown in FIG. 4.

Figure 3:
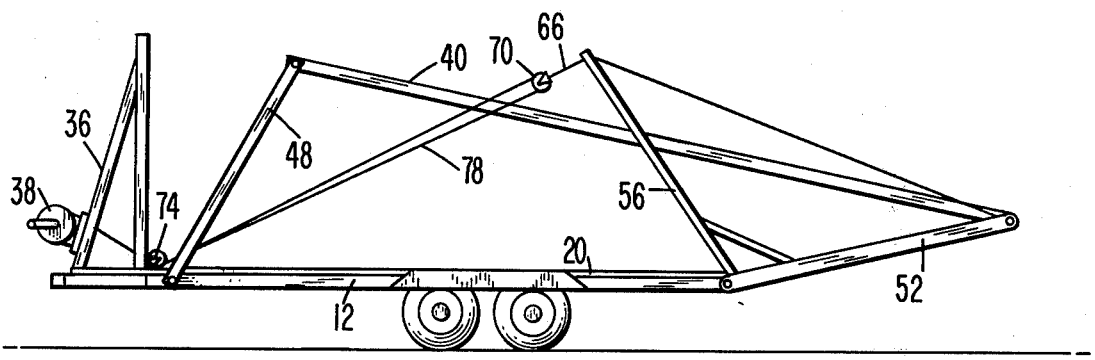
FIG. 3 is a side elevation view of the trailer of FIG. 1 with the load platform partially lowered.
Figure 4:
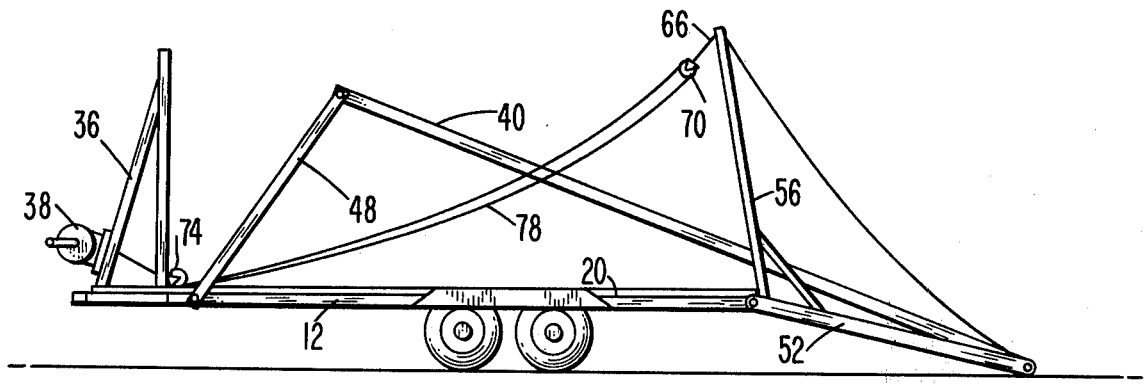
FIG. 4 is a side elevation view of the trailer of FIG. 1 with the load platform fully lowered.

To lower the load platform of the carrier frame 14 into its loading position, the securement lock 108 is released and the winch 38 is operated to pay out more of the winch cables 78 and 80, only the winch cable 78 being visible in FIGS. 3 and 4. The paying out of the winch cables 78 and 80 releases the tension on these cables between the pulley blocks 70 and 74 and 72 and 76. Inasmuch as the rear legs 52 and 54 of the carrier frame 14 are longer than the front legs 48 and 50 and are provided with a greater angle of tilt, the load platform will have an inherent tendency or bias to move rearwardly. Therefore the paying out of the winch cables 78 and 80 will cause the load platform to move as shown in FIG. 3. The legs 48, 50, 52 and 54 all pivot at both ends with all their top ends moving rearward. The rearmost end of the top frame side beams 40 and 42 drops as the load platform moves rearward and is pivoted downward, and the rising lift struts 56 and 58 engage the cables 66 and 68 by means of the yoke 64 provided at the end of each of them. The cables 66 and 68 are therefore entrained over the yokes 64 of the lift struts 56 and 58 so that tension can be maintained on the rearmost ends of the top frame side beams 40 and 42. When enough of the winch cables 78 and 80 are payed out, the top frame rear beam 46 hits the ground and the load platform of the carrier frame 14 forms a tilted ramp touching the ground, as shown in FIG. 4. The upper load can then be introduced onto the load platform at this angle, which is preferably approximately 15°. If desired an auxiliary winch could be provided on the load platform to help pull the upper load up the ramp onto the load platform. The load is then secured in place by appropriate means.

To re-erect the carrier frame 14 to its carrying position, the winch 38 is again operated, this time to pull the winch cables 78 and 80. As the winch cables 78 and 80 are pulled in, the bending of the cables over the lift struts 56 and 58 allows an upward lifting force to be exerted on the rearmost end of the load platform, which lifting force would otherwise be difficult to achieve. As the winch cables 78 and 80 are pulled in, the lift struts 56 and 58 are pivoted thereby lifting the end of the load platform and pivoting the rear legs 52 and 54 until the lift struts 56 and 58 are pulled to such a point that the cables 66 and 68 are lifted from the yokes 64. Then further pulling on the winch cables 78 and 80 is transmitted directly through the cables 66 and 68 to the rear end of the load platform to pull it inward until the load platform is again parallel to the trailer base 12. The winch 38 is then locked in place to secure the carrier frame 14 in its erected state and additional redundant locking can be accomplished by use of the securement lock 108.

Following the raising of the upper load platform, the lower load can be loaded onto the trailer base. If desirable additional cross-bracing can be placed on the carrier frame 14 to secure it against shifting during the towing of the trailer 10. Also, if desired, a canvas or plastic covering or tent can be provided to cover the trailer 10 and both loads during towing.

The guide channel formed between the guide channel beams 90 and 92 is designed as a guide to aid in loading the upper load on the load platform. The hitch post 94 serves as a trailer hitch for upper loads which require such a hitch. The hitch plate 96 moves to position as shown by the broken lines in FIG. 5 when not in use, the legs 98 and 102 all pivoting relative to both the hitch plate 96 and the hitch post 94. The locking tab 104 is used to secure the hitch plate 96 in its upper erected position.

Thus the dual load trailer of FIGS. 1-5 provides a stable highway vehicle for transporting two loads. The load platform of the carrier frame 14 is movable between a carrying position and a loading position so that loads can be on and off loaded. The raising and lowering of the load platform is controlled by a single winch, the winch 38, so that the entire procedure can easily be done by a single person. The lifting strut and cable arrangement allows the initial lifting procedure to be accomplished without any undue stress or strain.

Inasmuch as the present invention is subject to many modifications, variations and changes in detail, it is intended that all the subject matter in the foregoing specification or in the accompanying drawings be interpreted as illustrative, and not in a limiting sense.

What is claimed is:

1. A dual load trailer comprising
   a trailer base having wheel means thereon and adapted to carry a first load thereupon;
   a carrier frame mounted on the trailer base;
   a load platform of the carrier frame movable between a carrying and a loading position and adapted to carry a second load;

front and rear leg means on the carrier frame connecting the load platform to the trailer base and pivotally connected to both the load platform and the trailer base, the rear leg means being longer than the front leg means and being tilted rearwardly to bias the load platform to pivot rearwardly to lower the load platform to its loading position; and holding means to secure the load platform against rearward movement to hold the load platform parallel to the trailer base in its carrying position.

2. A dual load trailer as claimed in claim 1 wherein the front leg means are tilted forwardly, and wherein the angle of rearward tilt of the rear leg means is greater than the angle of forward tilt of the front leg means.

3. A dual load trailer as claimed in claim 1 wherein the holding means includes cable means attached to the load platform and a winch to hold tension on the cable means.

4. A dual load trailer as claimed in claim 3 wherein the cable means includes a pair of lifting and securing cables each attached at on end to the rear end of the load platform and each having a moving pulley block at the other end thereof.

5. A dual load trailer as claimed in claim 4 wherein lifting struts extend from the rear leg means, the lifting struts engaging the lifting and securing cables to allow the winch to lift the rear end of the load platform when it is lowered into the loading position.

6. A dual load trailer as claimed in claim 4 wherein the cable means includes a pair of moving pulley blocks, a pair of stationary pulley blocks and a pair of winch cables, the moving pulley blocks being on the ends of the lifting and securing cables and the winch cables extending over both the moving and the stationary pulley blocks to allow the winch to act on the load platform.

7. A dual load trailer as claimed in claim 1 wherein carrier frame includes a support post and the holding means includes a securement lock to secure to the support post.

8. A dual load trailer as claimed in claim 1 wherein the load platform has a guide channel formed in it to aid in loading an article thereon.

9. A dual load trailer comprising
a trailer base adapted to receiving a first load;
wheels on the trailer base;
a carrier frame attached to the trailer frame;
a vertically extending support post of the carrier frame;
a pair of winch supports of the carrier frame secured to said support post;
a winch secured to the winch supports;
a base of the carrier frame including a pair of side base beams, a front base beam and a rear base beam;
a load platform of the carrier frame including a pair of top frame side beams, a top frame front beam, a top frame rear beam and decking stretched therebetween;
the load platform having a guide channel formed therein;
a pair of front legs each pivotally attached to both a one of the top frame side beams and a one of the side base beams, the front legs both having a forward tilt;
a pair of rear legs each pivotally attached to both a one of the top frame side beams and a one of the side base beams, the rear legs both having a rearward tilt the angle of which is greater than the angle of the forward tilt of the front legs;
a pair of lifting and securing cables each attached to a respective one of the top frame side beams;
a moving pulley block attached to each lifting and securing cable;
a stationary pulley block attached to each side base beam;
a pair of winch cables each having one end secured to a one of the side base beams and another end secured to the winch and each extending through a one of the moving pulley blocks and the stationary pulley blocks;
a lifting strut extending forwardly at a fixed angle from each rear leg; a yoke at the end of each lifting strut; and
a securement lock to secure the load platform to the support post.

* * * * *